(12) United States Patent
Alfille (10) Patent No.: US 9,427,823 B2
(45) Date of Patent: Aug. 30, 2016

(54) APPARATUS AND METHOD FOR LASER CUTTING WITH A LASER IMPLEMENTING GAS PULSES, THE FREQUENCY OR PRESSURE OF WHICH IS CONTROLLED

(71) Applicant: Commissariat à L'Énergie Atomique et aux Énergies Alternatives, Paris (FR)

(72) Inventor: Jean-Pascal Alfille, Dijon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 340 days.

(21) Appl. No.: 14/350,859

(22) PCT Filed: Oct. 11, 2012

(86) PCT No.: PCT/EP2012/070169
§ 371 (c)(1),
(2) Date: Apr. 10, 2014

(87) PCT Pub. No.: WO2013/053832
PCT Pub. Date: Apr. 18, 2013

(65) Prior Publication Data
US 2014/0251962 A1    Sep. 11, 2014

(30) Foreign Application Priority Data

Oct. 13, 2011    (FR) ...................................... 1159277

(51) Int. Cl.
*B23K 26/04*    (2014.01)
*B23K 26/14*    (2014.01)
(Continued)

(52) U.S. Cl.
CPC ............. *B23K 26/04* (2013.01); *B23K 26/032* (2013.01); *B23K 26/14* (2013.01); *B23K 26/142* (2015.10);
(Continued)

(58) Field of Classification Search
CPC ...... B23K 26/04; B23K 26/14; B23K 26/16; B23K 26/38
USPC ............ 219/121.72, 121.67, 121.84, 121.85; 250/492.1
See application file for complete search history.

(56) References Cited

U.S. PATENT DOCUMENTS 5,473,136 A * 12/1995 Engelhardt .......... B23K 26/032
219/121.62
6,075,220 A    6/2000 Essien et al.
(Continued)

FOREIGN PATENT DOCUMENTS

DE    852302 A1    5/2000
EP    0533387 A2    3/1993
(Continued)

OTHER PUBLICATIONS

International Search Report for PCT/EP2012/070169 dated Dec. 4, 2012.
(Continued)

*Primary Examiner* — Samuel M Heinrich
(74) *Attorney, Agent, or Firm* — Pearne & Gordon LLP (57) ABSTRACT

The head (9) of the cutting apparatus (4) of the laser comprises a gas supply through a device such as a barrel dispenser which chops the blowing flow rate, which produces a better discharge of the liquid slag melt by the laser beam (16, 18) out of the plate (19) to be cut. A measurement (36) of backscattered light is made in order to check the good quality of cutting, the amount measured being smaller if the cutting actually passes through the plate (19), and the frequency or the pressure of the blowing pulses is adjusted by a controlling device (39) to keep the measure to a minimum by optimizing the slag discharge conditions.

9 Claims, 7 Drawing Sheets

(51) Int. Cl.
  *B23K 26/16*   (2006.01)
  *B23K 26/38*   (2014.01)
  *B23K 26/03*   (2006.01)
  *B23K 26/40*   (2014.01)

(52) U.S. Cl.
  CPC ........... *B23K 26/1437* (2015.10); *B23K 26/16* (2013.01); *B23K 26/38* (2013.01); *B23K 26/40* (2013.01); *B23K 2203/50* (2015.10)

(56) References Cited

U.S. PATENT DOCUMENTS

| | | | |
|---|---|---|---|
| 6,191,385 B1* | 2/2001 | O Loughlin | B23K 26/702 219/121.6 |
| 6,440,463 B1* | 8/2002 | Feldstein | A61K 9/0073 424/489 |
| 6,791,057 B1 | 9/2004 | Kratzsch et al. | |
| 8,822,875 B2* | 9/2014 | Webster | A61B 18/20 219/121.11 |
| 2004/0102764 A1* | 5/2004 | Balling | A61F 9/008 606/5 |
| 2008/0000888 A1 | 1/2008 | Schulz et al. | |
| 2010/0171944 A1* | 7/2010 | Langdon | G01P 5/26 356/28.5 |

FOREIGN PATENT DOCUMENTS

| | | |
|---|---|---|
| EP | 1916053 A1 | 4/2008 |
| WO | 2006045431 A2 | 5/2006 |

OTHER PUBLICATIONS

Written Opinion for PCT/EP2012/070169.
French Search Report for FR1159277 dated May 9, 2012.

* cited by examiner

APPARATUS AND METHOD FOR LASER CUTTING WITH A LASER IMPLEMENTING GAS PULSES, THE FREQUENCY OR PRESSURE OF WHICH IS CONTROLLED

TECHNICAL FIELD

The object of the invention is a laser cutting apparatus and method with frequency or pressure controlled gas pulses.

Cutting materials in particular metal materials by means of power lasers, such as $CO_2$ lasers and Nd—YAG lasers, has been a technique well-established in industry for several decades.

A conventional method consists in working with a pulsed beam laser. At each pulse, typically of 100 J for a duration of about 5 ms, the material to be cut is locally brought to a temperature higher than that of the melting point, a small volume of very liquid metal and thus having a low viscosity is obtained almost immediately. The apparatus is completed by a gas blowing auxiliary accompanying the laser directed to cutting and which efficiently expels the molten metal as a fine slag, without such slag to adhering to the flanks of the cutting. This process is almost instantaneous, and the following pulse of the laser gets started on a following portion of the metal whereas the preceding slag has disappeared from the cutting. This method thus allows an efficient cutting. Discharging the liquid slag is moreover too quick for the blowing gas to be able to solidify it as long as it is present in the cutting, which does not hinder discharge at all.

Unfortunately, this method suffers from a power restriction of the pulse lasers produced up to now. Cutting thick parts, in the order of a few centimeters, would impose using lasers of several kilowatts. Only continuous beam lasers have this power nowadays. Their application to the preceding method does not yield suitable results since a melt bath is constantly formed. This continuous bath is discharged with difficulty by the blowing gas and therefore tends to build up, while undergoing a gas cooling which increases its viscosity before solidifying it. The metal first molten can then remain in the cutting and even locally plug it, without the increase in the laser power providing an improvement.

The invention will find utility first of all for continuous beam lasers of a power higher than 1 kW, beyond the power commonly reached by pulsed beam lasers.

It is known (from EP-A-0 533 387 or US-A-2008/115862) that the blowing gas flow rate can be advantageously pulsed in order to eject one after the other small amounts of melt and restore an efficient discharge of the slag out of the cutting.

Although the method is then improved, this improvement is however inadequate in some circumstances, where some cutting flaws turned out to remain all the same.

A field where the invention will find a particular application is cutting in very harsh media (nuclear, biology, chemistry) where the cutting head is displaced by a robot arm or any other apparatus the movements of which are not very accurate and where the cutting parameters such as the distance from the cutting head to the part to be cut and its speed are approximate; vibrations are furthermore often observed; and characteristics of parts to be cut can also be approximately known or be very variable, and in particular their thicknesses. These are the reasons why the ideal values of the cutting parameters are unknown or likely to constantly change, without the possibility to apply these changes in the method, such that inadequate results, including incomplete cutting, can be observed.

It turns out that the cutting conditions strongly depend on the frequency and pressure of the gas pulses, such that, in accordance with the invention, it is decided to adjust at least one of these parameters in a control mechanism to ensure good cutting conditions.

The invention thus relates to an automatic laser cutting method comprising blowing a gas flow rate to a cutting location in order to sweep slag and gases produced by cutting, the blowing being performed through pulses, characterised in that it consists in continuously measuring a laser light backscatter intensity and modifying either a frequency, a pressure or both a frequency and a pressure of the pulses so as to keep said intensity to a minimum.

The frequency is advantageously modified through steps, the value of which can be between 1 Hz and 3 Hz.

The blowing frequencies can remain between limits beyond which it is judged that measurements other than the blowing setting should be taken to ensure a satisfactory cutting. These limits can be for example 2 Hz and 20 Hz. When they are reached, an increase in the laser power is imposed, this increase being advantageously temporary.

According to some optional advantageous adjustments, the laser beam can pass through the blowing nozzle, the laser beam and the blowing gas having parallel directions.

It is then advantageous however, that the nozzle has an oblong opening cross-section, through an end of which the laser beam passes. This arrangement enables the gas to be blown immediately behind the beam, where the melt has just appeared.

The oblong opening cross-section can be rectangular, elliptic, etc. A favoured shape is however achieved when the nozzle is split into two uneven portions, by a throttling, the laser beam passing through the smaller portion, and the blowing gas passing through the larger portion.

The blowing auxiliary can also comprise a plurality of nozzles all directed to the cutting location, one nozzle of which is directed parallel to the laser beam, and another nozzle obliquely to this beam. Their blows are thus directed in different and convergent directions, which is likely to improve slag discharge. A plurality of oblique nozzles can also be preferred, so as to provide respective blowing flow rates parallel to each other and intersecting the laser beam in different portions of this beam and so as to exert an efficient discharge on a greater depth of the part being cut.

It is to be contemplated that the blowing pulses be made with phase shifts between the nozzles when a plurality of them exists, to further improve slag discharge.

A good way to create gas pulses is achieved if the auxiliary comprises a revolving member dispenser in the supplying duct, the member comprising at least a port for opening the supplying duct periodically extending from the supplying duct to allow the blowing pulses. Advantageously, the port and the supplying duct have rectangular cross-sections with parallel sides and perpendicular to a direction of movement of the member in front of the supplying duct. This arrangement enables better designed pulses to be obtained.

Frequencies equal to each other or not of the blowing pulses can be retained for the nozzles when a plurality of them exists, without better characteristics having been unequivocally observed.

And the peak pressures of the pulses could be between 3 and 15 bars. It should be noted that a shutdown of blowing between pulses is not recommended, such that an intermediate pressure between 0.5 and 1 bar can be advocated between pulses. All these pressures are present at the outlet of the nozzle or of each of them as the case may be.

Alternatively, the same improvement effect in cutting can be obtained by controlling the pressure of gas pulses rather than their frequency, or by controlling both these parameters at the same time. The pressure can be controlled between 1 and 15 bars per 0.5 bar step, or more generally less than one bar. The control method is identical.

The invention will be now described in detail in connection with the following figures.

Figure 1:
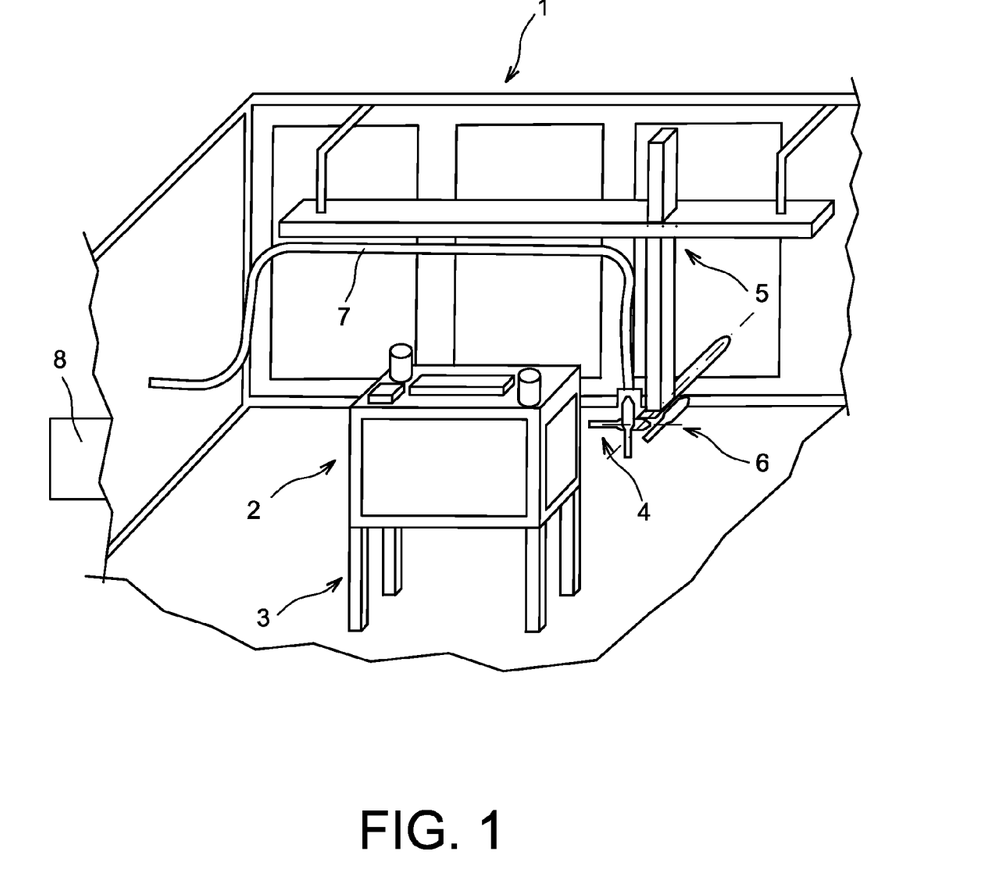
FIG. 1 illustrates a laser cutting apparatus.

FIG. 1 schematically represents a laser cutting apparatus and its environment. The apparatus is accommodated in a so-called breaking cell (1). An object to be cut such as a glove box used in some industries, is put on a bracket (3) in the cell (1). The apparatus (4) is suspended to the wall of the cell (1) through a 5-axes table (5). The table (5) consists in a group of parts sliding into each other so as to allow movements of the apparatus along the three main translation axes X, Y and Z, and a handle (6) hinged to the table (5) to subject the apparatus (4) to rotations θ and φ about two axes perpendicular to each other. A flexible cable (7) suspended to the table (5) on part of its length connects the apparatus (4) to a control facility (8); it comprises an optical fibre and a duct respectively providing laser light and blowing gas to the apparatus (4) from generators not shown in the control facility (8). The facility (8) is also used to move the apparatus (4) by acting onto the table (5) and the handle (6) so as to place and direct it in front of all the faces of the box (2), which will be fully cut by intersected runs. Since all these elements are known, they will not be illustrated more in detail and FIG. 2 will now be described. The apparatus (4) comprises a cylindrical head (9) with conical ends and which is supported by the handle (6). The upper end of the head (9) lets the end of the optical fibre (10) pass and the lower end is a blowing nozzle (11). The head (9) carries a first gas dispenser (12) to which a first end (13) of the gas duct leads, and a second supplying dispenser (14), to which a second end (15) of the gas duct leads. The first dispenser (12) has an outlet end passing through the wall the head (9), but the second (14) remains outside of the head (9) and its outlet end is at an angle with the same, which can be obtained by tangently hooking it to the conical outer wall of the nozzle (11). The laser beam (16) passes through the head (9) downwards and exits therefrom through the nozzle (11); it is focused by lenses (17) placed on top of the head (9) so as to take a section which is throttled a bit below the nozzle (11), either located at the surface of the plate, or at half-depth of the plate (19) to be cut. It further passes through a window (20) splitting the inside of the head (9) in order to act as a barrier to the gas emitted by the first dispenser (12).

Figure 2:
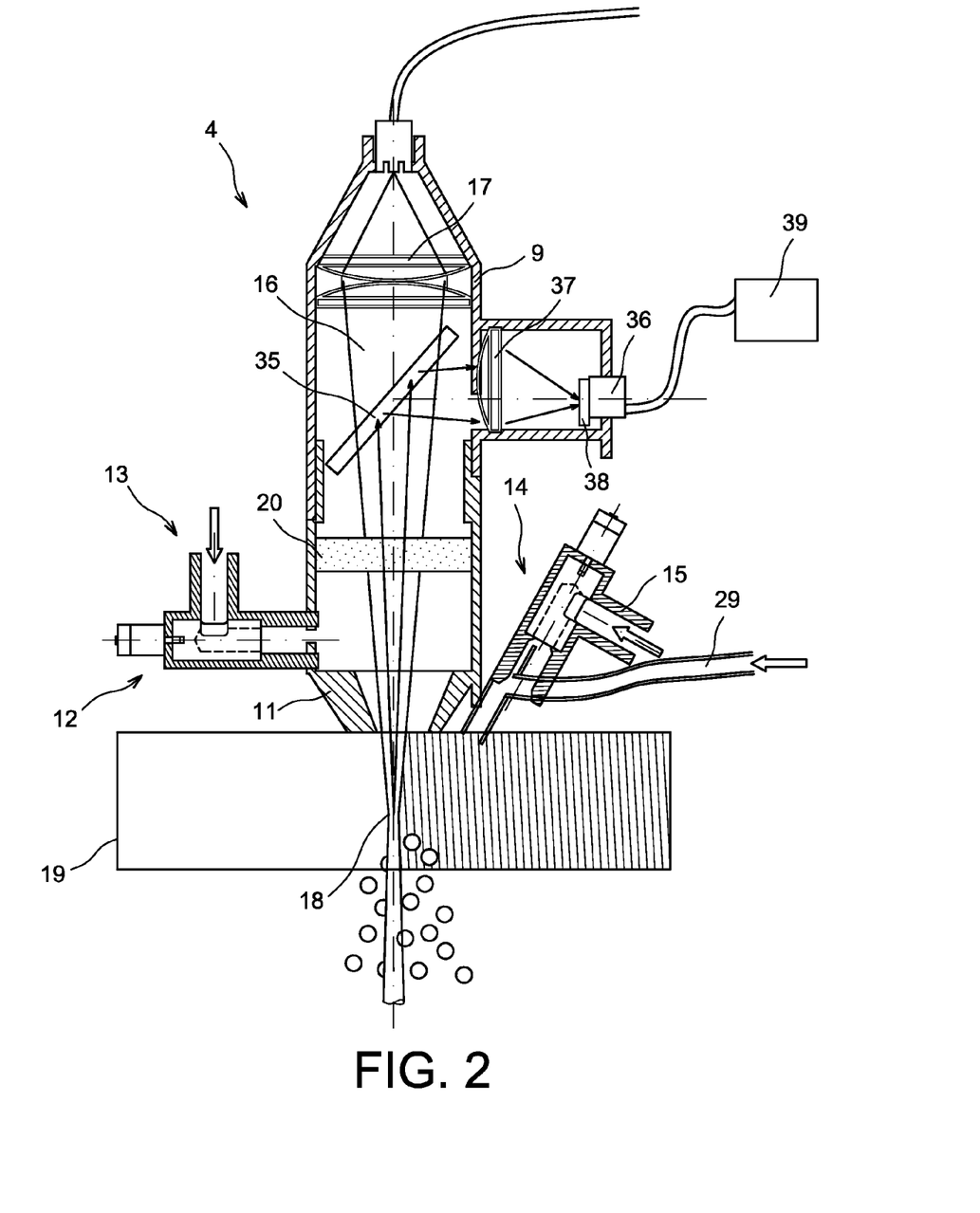
FIG. 2 represents a cutting head.

The device further comprises a beam splitter (35) on the path of the laser beam (16), which lets light pass to the plate (19), but reflects the one which is reflected back from this plate (19). Since the beam splitter (35) is oblique, the light is reflected back to a detector (36) located on the head (9) side, and a focusing lens (37) as well as interference filter (38) are provided in front of the detector (36) to focus light reflected back thereto and let only the wavelength of the laser beam (16) pass. The detector (36) is connected to a control device (39) not shown in detail and which controls the laser as well as the gas blowing in a way described later.

Figure 3:
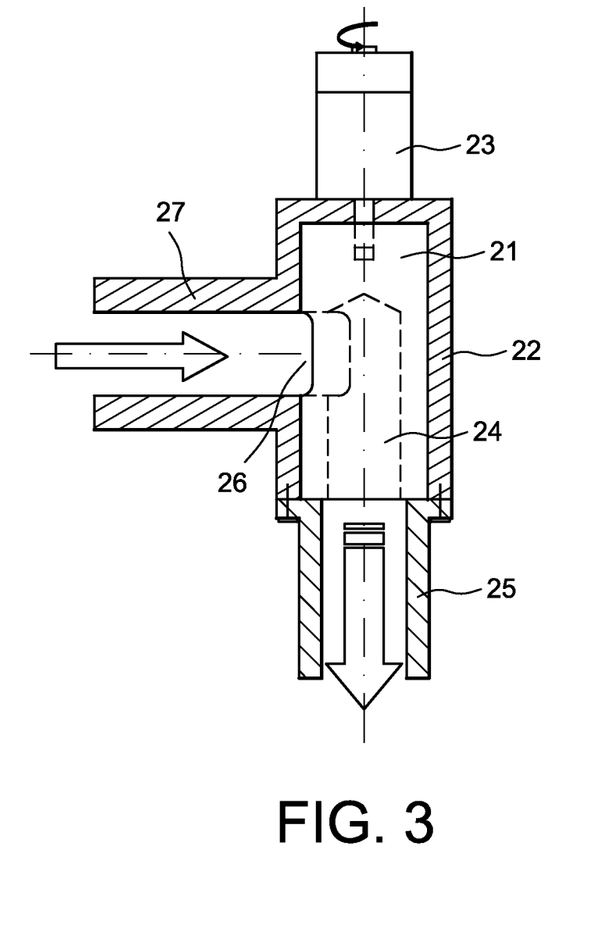
FIG. 3 represents a revolving gas dispenser.
Figure 4:
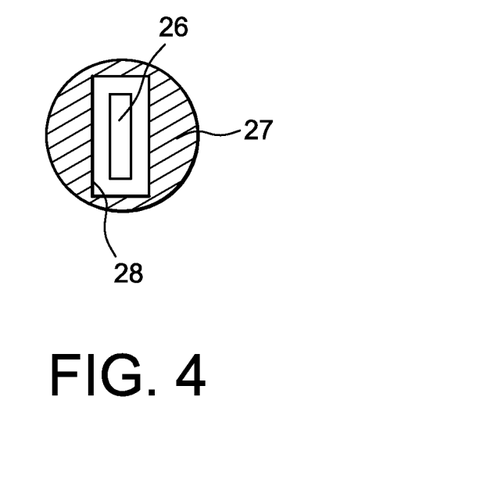
FIG. 4 represents a cross-section view A-A taken in FIG. 3.
Figure 5:
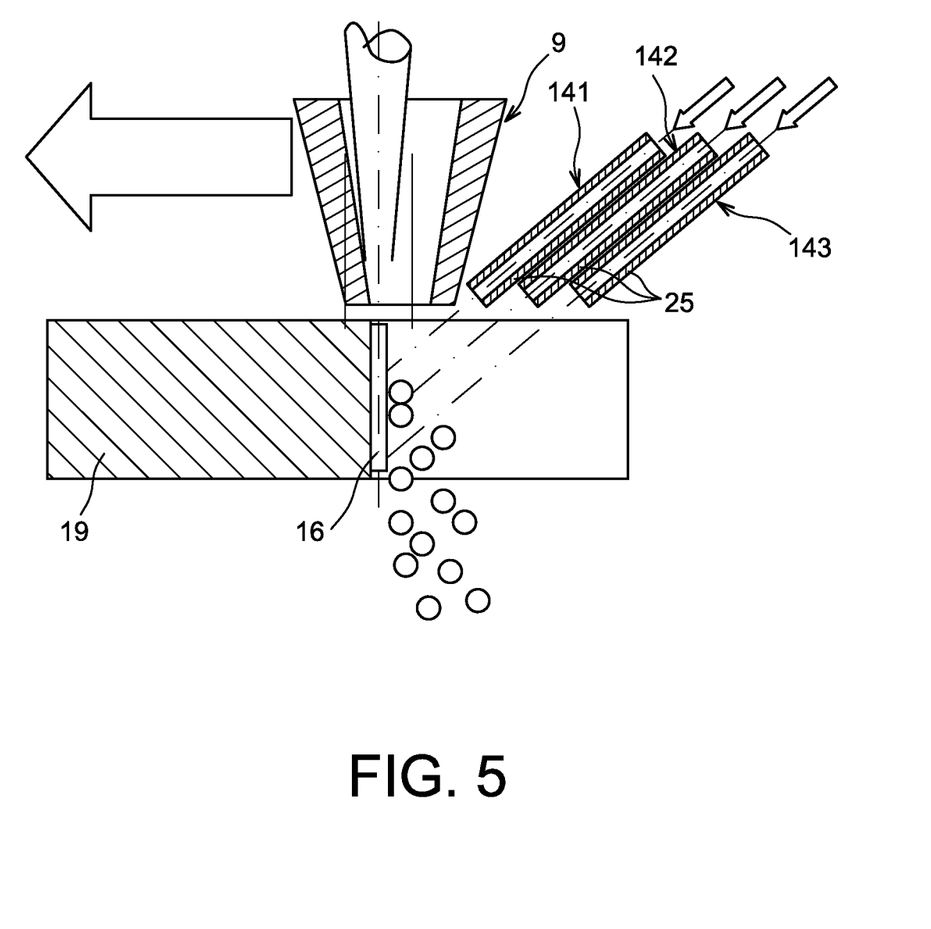
FIG. 5 illustrates an alternative cutting head end.
Figure 6A:
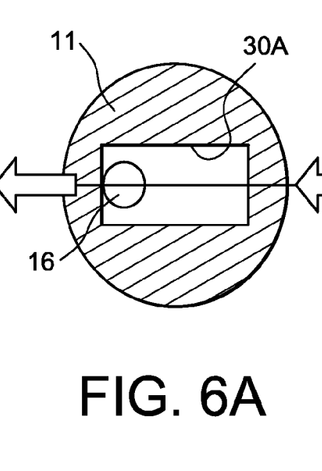
FIGS. 6A, 6B, 6C and 6D illustrate cross-section views of blowing nozzles.
Figure 6B:
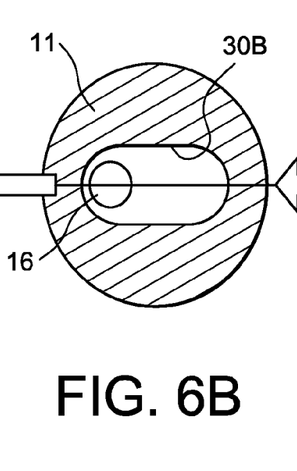
Figure 6C:
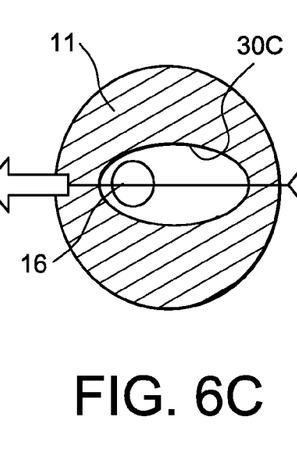
Figure 6D:
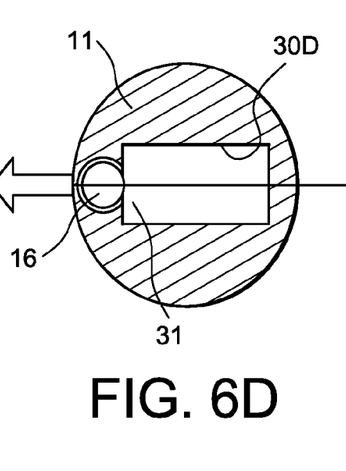

Each of the dispensers (12 and 14) comprises, as is represented in FIG. 3, a barrel (21) mounted in a cylindrical housing (22) and which is rotatable under the action of a motor (23). The barrel (21) comprises a coaxial recess (24) opening to an outlet nozzle (25) and one or more slots (26) distributed about its periphery and communicating to the recess (24); the rotation of the barrel (21) makes them pass regularly in front of the inlet end (27) of the dispenser where the end (13 or 15) of the gas duct connects; FIG. 4 shows that the slots (26) have a rectangular cross-section, with major sides in the axial direction of the barrel (21), and that the inner section (28) of the inlet port (27) is also rectangular, still with major sides directed along the axis of the barrel (21). The dispenser (14) is similar to the dispenser (12) (possibly apart from the dimensions or proportions) except that it further comprises a powder introducing duct (29), incidentally optional. The powder can assist in projecting slag by communicating them its kinetic energy (it will then often be of the same material as the plate), or cause an exothermic reaction in contact with the melt bath, which increases its temperature. FIG. 5 schematically represents a design derived from FIG. 2, wherein the oblique dispenser (14) would be provided in several copies (141, 142, 143, etc.), their outlet ports being all placed parallel to each other and at an angle with the main direction of the head (9), and superimposed so as to intersect the laser beam (16) at different depths of the plate (19).

The laser beam (16) is projected to the plate (19) and drills it. The main gas flow through the first dispenser (12) and the head (9) projects melting slag downwards. The dispenser (14) or dispensers (141, 142, 143) carry out further blowing to the front cutting bound and complete the action of the main blowing. The revolving barrels (21) repeatedly seal the dispensers and chop the blowing gas flow rates by giving them a pulsed character. It has been seen that this characteristic ensures a good slag discharge out of the plate (19). Numerous ways for producing a suitable blowing exist provided that this principle of pulsed flow rate is met, by varying the number and directions of the dispensers and their outlet ports for example. However, it should be emphasised that the nozzle (11) has advantageously an oblong port directed in the cutting direction such that the laser beam (16) is ahead of this port and that the gas blowing from the first dispenser (12) occurs a bit behind the laser beam (16), where the liquid slag has formed. FIGS. 6A, 6B, 6C and 6D respectively illustrate a rectangular port (30A), an oblong port (30B) with rounded ends, an elliptic port (30C) and a port (30D) having a complex keyhole shape comprising a rectangular main portion assigned to the gas blowing and a circular front portion fitted to the diameter of the laser beam (16) and used for its passage, these parts being joined by a throttling (31).

The power of the continuous beam laser can be several kW as a function of the thickness to be cut, typically of several centimeters.

Figure 7:
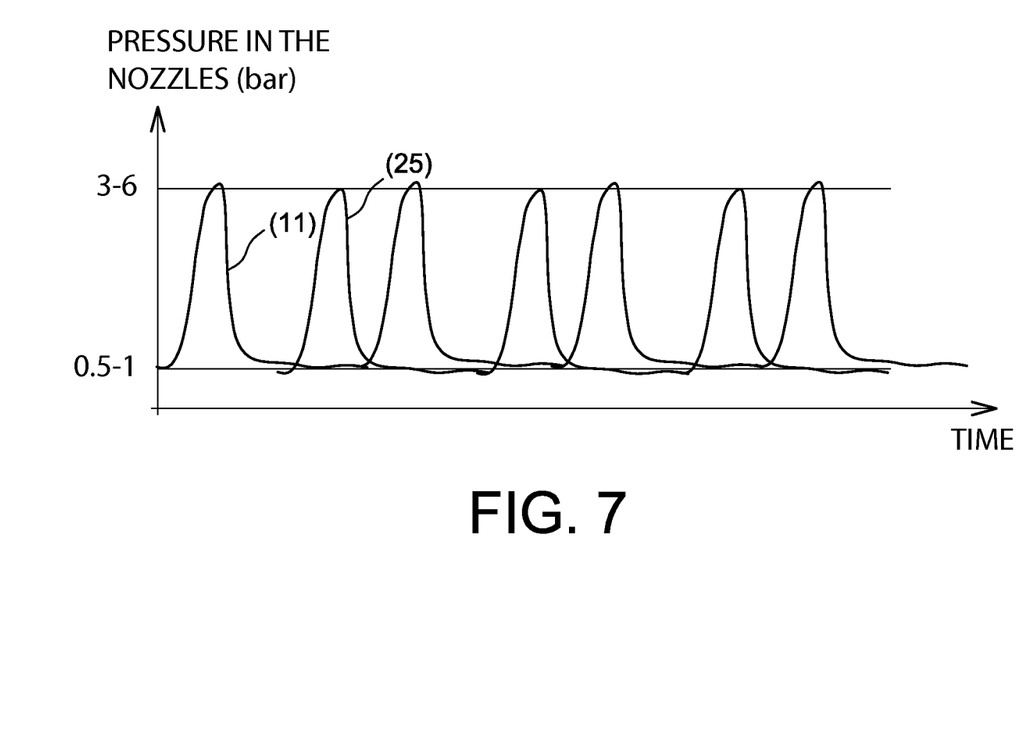
FIG. 7 is a time diagram for blowing.

It seems advantageous to select different blowing phases for different dispensers, as shown in the graph of FIG. 7, which illustrates the pressures emitted by the nozzle (11) and the outlet nozzle (25) of the second dispenser ((14). It can be seen that the phase shift is 4π/3, the frequencies being constant. The pressures are also the same, and between an upper level having a value of 3 to 15 bars for example, and a lower value of 0.5 and 1 bar for example. It is indeed disadvantageous to shut down blowing, which would allow upflows hazardous for the head (9) or an efficient operation thereof, of fumes or even liquid slag. The residual pressure can be achieved with a sufficient frequency of the pulses or through further ports through the barrel (21). The gas pulses can each have durations of 1 ms to 100 ms. An adjustment in the pulse durations can also be achieved by varying the speed of rotation of the barrel (21) when the ports (26) of the barrel (21) pass in front of the end (13 or 15) of the gas duct. An easy to made control can be made for this, by providing the barrel (21) with an angular position coder. The adjustment in the average speed of rotation of the barrel (21) enables the frequency of the blowing pulses to be adjusted, and thus the discharge of cutting wastes to be improved. More precisely, the average speed of rotation of the barrel (21) is double and comprises a first invariable speed used to pass the ports (26) in front of the end (13 or 15) of the gas duct with a constant pulse duration, and a second variable speed, used for the other angular positions of the barrel (21) in order to vary the duration between each of the gas blowing pulses according to the characteristic of the invention.

The most important aspects of the invention will now be described. It has already been mentioned that unavoidable uncertainties and disturbances in a great number of real situations fail to set at best beforehand cutting parameters, and the failure thereof caused by an inadequate discharge of slag and melt could not be excluded.

A greater portion of light from the laser beam (16) is backscattered when cutting becomes inadequate, and part thereof arrives at the detector (36) after penetrating the cutting head (9) and being reflected by the beam splitter (35). The control device (39) constantly measures the intensity of the backscattered light which arrives at the detector (36).

But it appears that there is a blowing gas flow rate for which the cutting quality is optimum: if the gas blowing is inadequate, discharge of slag and melts is difficult since the total kinetic energy of the gas flow rate is not sufficient; but if this flow rate is too high, cooling of melting metal is also greater, which increases its viscosity and can resolidify it too early by increasing the risk that it could be retained and replug the herf.

The control thus relies on a continuous variation in the gas blowing flow rate and in particular of the pulse frequency, by trying to keep the signal of the detector (36) at the lowest level. If, however, the minimum thus obtained is at a too high value, the power of the laser beam (11) will be increased in order to make cutting more vigorous. This control relates to all gas flow rates when there are several of them.

Figure 8:
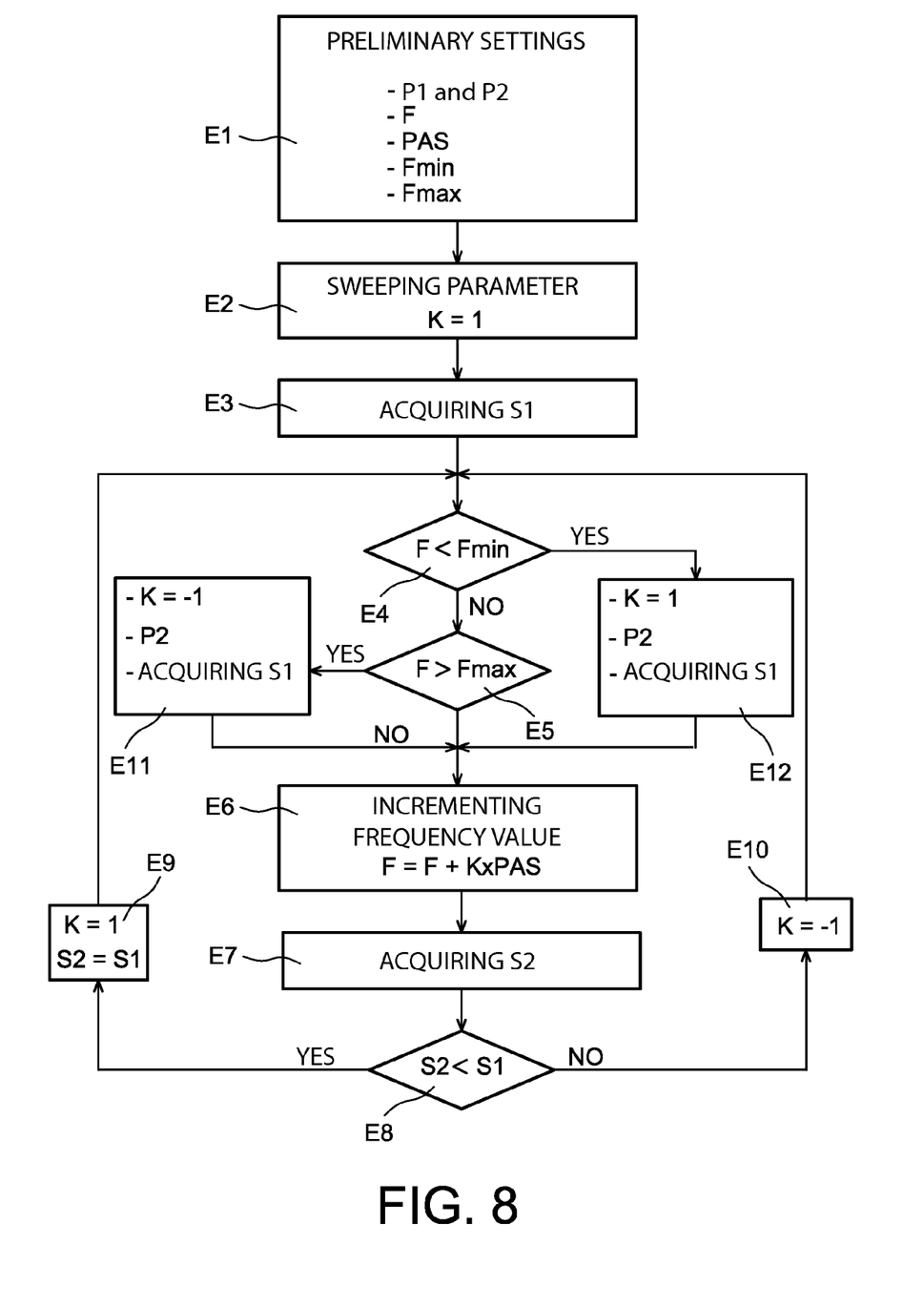
FIG. 8 is a flow diagram of the method of the invention.

FIG. 8 will now be explained. The first step E1, performed before carrying out cutting, consists in introducing preliminary settings from which the laser power (4) (for example P1=6 kW under normal circumstances and P2=7 to 8 kW under exceptional circumstances), a frequency of the gas pulses F=10 Hz, a variation increment of this frequency (PAS=2 Hz), a minimum frequency of 5 Hz, a maximum frequency of 15 Hz can be cited; all these values are given by way of example, wherein bounds of 2 Hz and 20 Hz can also be provided. In the following step E2, a frequency mod parameter K is temporarily set, for example at K=1, and in the following step E3, a value S1 measured by the detector (36) is recorded.

The continuation of the program is performed in a loop. It is first checked successively initialisation steps E4 and E5 that the frequency F of the gas pulses is between the minimum and maximum $F_{min}$ and $F_{max}$. In such a case, the pulse frequency is modified and becomes equal to F+K×PAS (E6). In the following step E7, a new measurement S2 of the detector (36) is recorded. If it is lower than the previous value S1 (E8), the sweeping parameter K is kept at 1, the value of S1 is replaced by that of S2 (E9) and a new loop is performed from E4. In the opposite case (E10), K becomes equal to −1 and once again a new loop is performed from E4. The effect of this loop is thus that the frequency of the sweeping pulses is constantly modified while measuring the light backscattered to the detector (36). If this value decreases, which means that cutting is better, the sweeping direction is favourable and the latter is continued under the same conditions; if on the contrary this value increases, the sweeping is resumed in the opposite direction to search for a minimum of detected value.

If step E4 reveals that the frequency has fallen below the minimum, the parameter K is set to 1, the laser is put at the upper power P2 and an acquisition of the signal S1 is then performed (E11); and if the step E5 reveals that the frequency has become higher than the maximum frequency, K is set to −1, the power P2 is introduced and an acquisition of the signal S1 is performed again (E12). Step E6 is then carried out in both cases. Therefore, the desired sweeping zone is reached to search for the measurement minimum of the detector 36, by considering that the increase in the laser power will give a satisfactory cutting even if there is an extra thickness or disturbances in the method. This increase in power is temporary and automatically ends, with a return to P1 after a determined duration without the process being otherwise altered.

In another embodiment of the invention, the effect of which is identical on the cutting quality, the pulse frequency is constant but the gas pressure in the blowing nozzles is controlled, for example by modifying the opening degree of adjustable valves. For a nominal pressure of 5 bars for example, the pressure bounds can be 1 bar and 15 bars, and the pressure increment step of 0.5 bar. The method is exactly the same as previously, except that the above values replace P1, P2 and PAS, and that the speed rotation of the barrel (21) remains constant.

It is to be further contemplated to perform a double control by varying both frequency and pressure parameters of the pulses, for example alternately by series, or by favouring the work on a parameter when the other has reached a threshold or does not allow for equally quick improvements.

The invention claimed is:

1. An automatic cutting method, comprising blowing a gas flow rate to a cutting location in order to sweep slag and gases produced by cutting, the blowing being performed through pulses, characterised in that it consists in continuously measuring a laser light backscatter intensity and modifying either a frequency, a pressure or both a frequency and a pressure of the pulses so as to keep said intensity to a minimum.

2. The automatic laser cutting method according to claim 1, characterised in that the frequency or pressure is modified through steps.

3. The automatic laser cutting method according to claim 2, characterised in that the frequency steps have a value between 1 Hz and 3 Hz.

4. The automatic laser cutting method according to claim 2, characterised in that the pressure steps have a value lower than 1 bar.

5. The automatic laser cutting method according to claim 1, characterised in that the frequency or pressure is comprised between limits, and when the limits are reached, an increase in the laser power is imposed.

6. The automatic laser cutting method according to claim 3, characterised in that the frequency limits are 2 Hz and 20 Hz.

7. The automatic laser cutting method according to claim 4, characterised in that the pressure limits are 1 bar and 15 bars.

8. The automatic laser cutting method according to claim 5, characterised in that the increase in power is temporary.

9. A cutting apparatus, comprising a laser head (9) and a gas blowing auxiliary, the auxiliary comprising a gas supplying duct (13, 15) and a gas blowing nozzle (11, 29), downstream of the supplying duct, the nozzle being directed to the cutting location, the auxiliary comprising a device (12, 24; 141, 142, 143) for splitting blowing into discontinuous repeated pulses, characterised in that the laser is a continuous beam laser having a power higher than 1 kW and the apparatus comprises a detector (36) having a light power backscattered by the cutting location and a device (39) for controlling either frequency or pressure, or frequency and pressure of the pulses in response to measurements of the detector.

* * * * *